Sept. 17, 1935.　　　　G. A. LYON　　　　2,014,656
TIRE COVER
Filed Sept. 15, 1932　　2 Sheets-Sheet 1

Inventor
George Albert Lyon.
By Charles W. Hills
Attys.

Sept. 17, 1935.   G. A. LYON   2,014,656
TIRE COVER
Filed Sept. 15, 1932   2 Sheets-Sheet 2
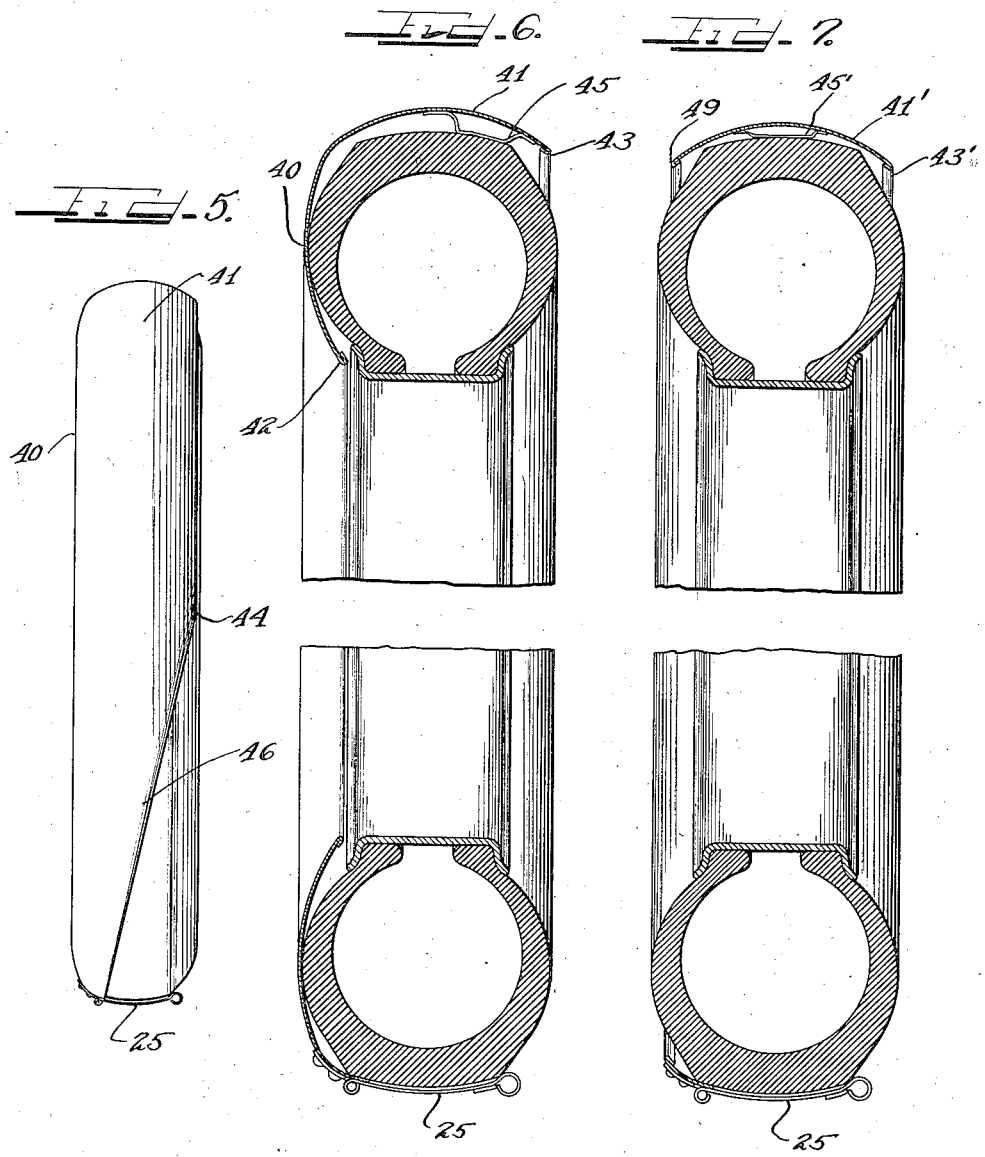
Inventor
George Albert Lyon.
by Charles H. Hills Attys.

Patented Sept. 17, 1935

2,014,656

UNITED STATES PATENT OFFICE 2,014,656

TIRE COVER

George Albert Lyon, Allenhurst, N. J., assignor to Lyon Incorporated, Asbury Park, N. J., a corporation of Delaware Application September 15, 1932, Serial No. 633,224

8 Claims. (Cl. 150—54)

This invention relates to an automobile spare tire cover and more particularly to a tire cover with a substantially continuous ring for disposition over the tread part of the tire.

An object of the present invention is to provide an improved spare tire cover which may be readily applied to a spare tire and which is economical to manufacture.

Another object of the present invention is to provide an improved spare tire cover with a novel means for aiding in the retention of the cover on the tire.

Another object of the present invention is to provide a spare tire cover including a side plate portion for disposition over an outer side wall of a spare tire and a tread covering portion for disposition over the tread of the tire which tread covering portion comprises substantially a continuous band.

In accordance with the general features of one form of this invention there is provided a multi-part spare tire cover including a ring-like plate for disposition over an outer side wall of a spare tire and having a curved convex cross section and a tread covering band for disposition over the tread of the tire for cooperation with the side plate for retaining the same in proper position on the tire, said band being substantially continuous and being cut away along its back edge at the bottom of the cover or tire for aiding in its ready application to the tire.

Another feature of the present invention relates to the provision of a retaining means at the bottom of the cover for engaging the portion of the tread of the tire not covered by the lower part of the continuous band to aid in the retaining of the band in proper tire protecting position on the tire.

Still another feature of the invention as embodied in other forms of the invention is to provide a relatively non-flexible cover adapted to be shoved over the tread of the tire and to be thereafter retained in position by means at the bottom of the cover.

Other objects and features of this invention will more fully appear from the following detail description taken in connection with the accompanying drawings which illustrate a single embodiment thereof and in which Figure 1 is a side elevation of a tire cover embodying the features of this invention;

Figure 5 is an end elevation of another form of cover embodying the features of this invention and showing it applied to a tire;

Figure 6 is an enlarged fragmentary vertical sectional view through the cover and tire shown in Figure 5; and Figure 7 is a sectional view similar to Figure 6 of still another form of the invention.

As shown in the drawings:

Figure 1:
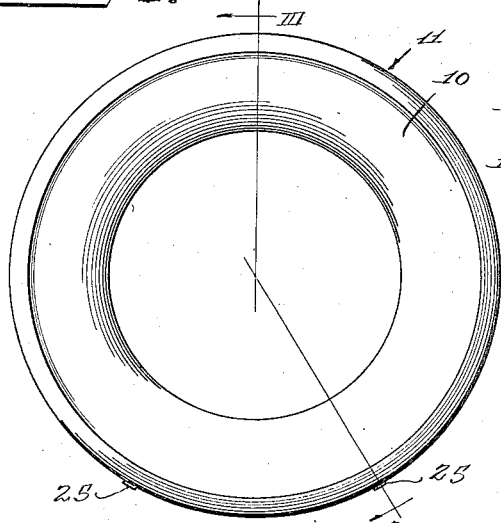

The tire cover illustrated in the drawings may be applied to either a spare tire mounted in the fenderwell or to a spare tire mounted at the rear of an automobile. In the preferred form of the cover illustrated in the drawings the cover is shown as consisting of two parts namely a ring-like side plate 10 for disposition over an outer side wall of the spare tire and a substantially continuous tread covering part or band 11 for disposition over the tread of the spare tire 12 and for cooperation with the plate to retain the same in proper tire protecting position on the tire.

The side plate part 10 is of annular form and has a curved concave cross section so as to enable it to conform with the contour of the outer side wall of the spare tire 12. The peripheral edge of this ring 10 is turned back upon itself as shown at 13 so as to provide a non-cutting edge and the outer peripheral edge of this ring is beaded at 14 so as to receive a rubber cushioning strip 15 for contact with a marginal portion of the tread band 11.

It should also be noted that the outer marginal portion of the side part 10 is curved inwardly toward the tread of the tire so as to more closely conform with the contour of the spare tire and whereby the side plate is more readily centered on the outer side wall of the tire.

The continuous band 11 is also of curved convex cross section or in other words is interiorly concave so as to enable it to accommodate itself to the transverse curvature of the outer periphery of the tire. Sufficient clearance is provided between this band and certain portions of the tire tread so that the band may accommodate itself to slight variations or changes of contour in the treads of tires of a given size but of different makes.

The band 11 includes two inwardly curved marginal portions each of which is provided with a turned edge as indicated at 16 and 17 such turned edges being desirable in that they lessen the possibility of one's cutting his or her hand by such edges in the application of the cover to a spare tire.

It will also be noted that the inwardly turned margin of the band having the turned edge 16 is positioned for frictional cooperation with the cushioning strip 15 on the outer periphery of the side plate 10. The line of contact between the band and the plate is not necessarily a fixed line and may vary inwardly or outwardly relative to the median line of the tire depending upon the fit between the band and the particular spare tire being covered thereby.

Figure 3:
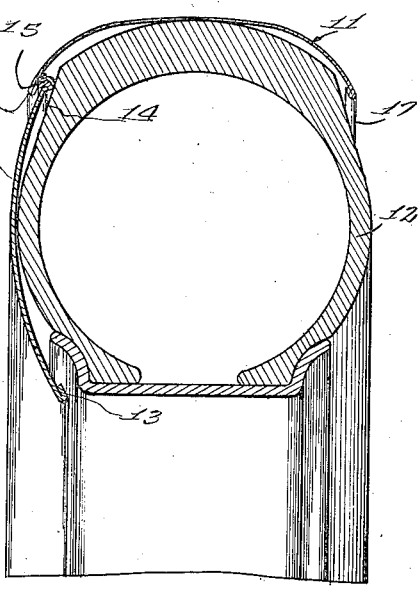
Figure 3 is an enlarged fragmentary sectional view taken on the line III—III of Figure 1 looking in the direction indicated by the arrow and showing the manner in which the cover cooperates with the spare tire.
Figure 2:
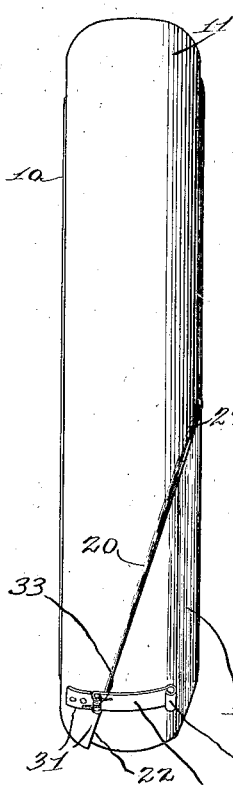
Figure 2 is an enlarged end view of the tire cover shown in Figure 1 and illustrating the tire cover as being applied to a spare tire.
Figure 4:
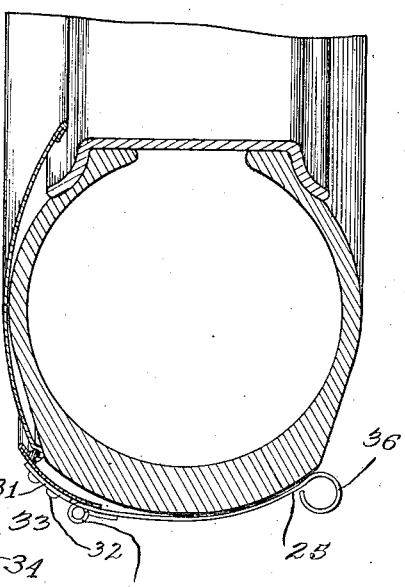
Figure 4 is an enlarged detail view looking upwardly from the bottom of the cover at one of the retaining elements for aiding in retaining the tire band of the cover in proper tire protecting position on the tire.

While the band is illustrated as being substantially continuous as distinguished from a split band it should be noted that at its lower portion or in other words its portion beyond its upper half the rear edge on both sides of the tire is cut away on a bias or on a diagonal as indicated at 20 in Figures 2 and 3. That is to say the band 11 below the upper half of the cover and tire is cut away on each side of the tire on a diagonal line extending downwardly and inwardly toward the median line of the tire and band. The upper extremity of this diagonal cut on each side of the spare tire starts substantially below the upper 180° of the band as shown in Figure 2 at 21 and terminates at 22 in the peripheral portion of the tread band between the median line of the band and the side plate 10. Each of the diagonal edges as shown in Figure 2 may be slightly flared so as to aid in preventing such edges from catching on the protuberances of the tire tread.

Now in the application of this cover to the tire the flared portions of the rim band 11 adjacent the points 21 on each side of the cover below the upper half of the cover are flexed so that these portions may clear the tread of the tire as the cover is being shoved into position. Of course it is to be appreciated that one side of the cover may be first engaged over the tire tread and then the other side at the portion 21 of that side may be flexed so as to enable the cover band 11 to be shoved clear across the tread of the tire. Thereafter if it is necessary the band may be pushed slightly downwardly so that the portions 21 hug under the tire and not only serve to hold the tire band 11 in place but cause that band to properly engage the side plate 10 and also hold it in proper tire protecting position.

While it is to be appreciated that the cover band 11 is to a certain extent self-retaining on the tire still it may be provided with a supplemental retaining means in the form of spaced transverse retaining arms disposed at the bottom of the cover as shown in Figure 1 on either side of the vertical center of the cover. These arms are designated by the reference numeral 25—25 and inasmuch as they are substantially identical it is thought that a description of one will suffice for both. Each of these arms 25 includes a pair of spaced eyes 26 and 27 mounted over the ends of a hinge bolt 28. Disposed between the two eyes 26 and 27 are two fixed eyes 29 and 30 formed integral with a fixed plate 31 suitably fastened by any means such for example as rivets 32 to the bottom of the cover band 11. A spring 33 is mounted on the hinge bolt 28 between the eyes 29 and 30 and has one end 34 in engagement with the arm 25 and has its other end 35 in engagement with the fixed plate 31 whereby this spring is caused to at all times exert a resilient action on the arm tending to force it in a direction toward the tread of the tire.

The free end of each of the arms 25 is provided with a finger hook or eye 36 by means of which the arm may be pulled away from the tread of the tire when it is desired to remove the tire band from the tire.

In other words by manually engaging the finger eyes 36 on the two arms and then pulling these arms outwardly away from the tread of the tire it is possible to use these arms to exert a lateral pull on the tire band whereby its intermediate portions 21 are caused to be flexed and the tire band pulled laterally and upwardly off of the tire tread.

In Figures 5 and 6, I have illustrated a modification of the invention in the form of a unitary cover which has a retaining arm 25 at the bottom of the cover for aiding in holding the cover in proper tire protecting position. Since this arm 25 is the same as the arms 25 described in connection with the preferred form of the invention it is thought that no further detail description of this retaining arm is necessary. In this form only one arm 25 is used on a cover.

In this form of the invention the cover embodies a ring-like side portion 40 of curved convex cross section and an arcuate rim or tread covering portion 41 which is also interiorly curved. These portions 40 and 41 as shown in Figure 6 are illustrated as being integral. Also it should be noted that the free edges of the portions 40 and 41 are turned as indicated at 42 and 43 so as to provide non-cutting edges.

While the ring portion 40 is illustrated as being in the form of a substantially continuous circle the tread covering portion 41 is formed partly open at the bottom as shown in Figure 5. The upper half of this rim portion 41 is continuous and the extremities of this half terminate at the halfway mark of the tire as indicated at 44 in Figure 5. In other words the rear turned edge 43 of the tread portion 41 is in the form of a half circle and has its ends terminating at 44 whereby the cover may be pushed downwardly from the top of the tire into position on the tire and may be removed by merely pushing it upwardly off the tire. In order to facilitate this operation of applying and removing the cover to the tire I preferably make the rim portion 41 of a larger diameter than the diameter of the outermost periphery of the tire which it is designed to cover. Then in order to prevent rattling between this cover and a smaller sized tire I provide a plurality of spacers inside of the upper half of the cover such as the spacer 45 shown in Figure 6. These spacers may be two or more in number disposed in the upper half of the rim 41 and are positioned to engage the tread of the tire to the rear of the median plane of the tire. Also each spacer is of a U-shape construction and has its ends suitably anchored to the cover rim 41 by means of welding or the like.

The lower half of the cover rim 41 is formed by cutting the rim at both sides of the tire on a bias or on a diagonal line as indicated at 46 in Figure 5. This diagonally cut edge starts at or slightly above the halfway mark of the cover and terminates at its lower end adjacent the side wall portion 40 as shown in Figure 5.

It should also be noted that the upper end of each of the diagonal edges 46 may be slightly flared if it is so desired so as to prevent such edges from getting caught in the protuberances of the tread of the tire during the operation of applying the cover to the tire.

Now in the application of the cover to the tire the arm 25 at the lower half of the cover is swung to its outermost position so as to not interfere with the tire as the cover is applied thereto and the cover is thereafter shoved downwardly onto the tire whereby the two spring-like spacers 45 are brought into contact with the upper half of the tread of the tire. Thereafter the arm 25 at the lower extremity of the cover may be swung into the position shown in Figures 5 and 6 whereby it pulls the cover down onto the tire and causes the spacers 45 to be brought into tight engagement with the tread of the tire whereby a spaced three point contact between tire tread and cover is effected and rattling is substantially prevented. Also in this act of forcing the cover down into proper tire protecting position on the tire the spring-like spacer elements 45 due to the fact that they are located to the rear of the median line of the tire act to pull the front portion 40 of the cover into engagement with the outer side wall of the tire as shown in Figure 6.

In Figure 7, I have illustrated a modification of the invention in which there is provided only a rim portion 41' like the rim 41 with the exception that this rim 41' does not have a front portion 40 but rather instead has its front edge turned adjacent the front side of the tire as indicated at 49. The rear edge of this rim 41' is turned as indicated at 43'. This rim 41' may be formed in the same way as the rim 41 so that it may be shoved downwardly on the tire from the top of the tire. Also it is provided with a plurality of yieldable spacer elements 45' which are similar to the elements 45 but are located in the center of the rim so as to be disposed at the median plane of the tire. In other words there is no necessity for disposing these elements 45' to the rear of the median line inasmuch as this form of the invention does not have an outer side wall portion such as the portion 40 for engaging the outer side wall of the tire.

With the exceptions noted above this form of the invention operates in substantially the same manner as the form shown in Figures 5 and 6 and accordingly it is thought that no further description of the same is required.

Now it is of course to be understood that while I have illustrated and described in detail the preferred embodiment of the invention, the invention is not to be thus limited but only insofar as defined by the scope and spirit of the appended claims.

I claim as my invention:

1. In a spare tire cover, a circular tread covering band, flexible spacing means for accommodating said band to treads of different diameters and arranged to space a part of the band from the tread without interfering with the placing of the band into proper tire protecting position, and band retaining means engageable with the tire to hold the band in said position.

2. In a spare tire cover, a circular tread covering band, flexible spacing means for accommodating said band to treads of different diameters and arranged to space a part of the band from the tread without interfering with the placing of the band into proper tire protecting position, and band retaining means engageable with the tire to hold the band in said position, said retaining means being movable so as not to interfere with the placing of the band as aforesaid.

3. In a spare tire cover, a circular tread covering band, flexible spacing means engageable with the tread rearwardly of the median plane of the tire and constructed and arranged to accommodate the band to treads of different diameters and to space a part of the band from the tread without interfering with the placing of the band into proper tire protecting position, and band retaining means cooperating with said spacing means and the tire to hold the band in said position.

4. In a spare tire cover, a circular tread covering band, flexible spacing means disposed entirely within the confines of said band and for accommodating said band to treads of different diameters and arranged to space a part of the band from the tread without interfering with the placing of the band into proper tire protecting position, and band retaining means engageable with the tire to hold the band in said position.

5. In a spare tire cover, a circular tread covering band, flexible spacing means for accommodating said band to treads of different diameters and arranged to space a part of the band from the tread without interfering with the placing of the band into proper tire protecting position, and band retaining means engageable with the tire to hold the band in said position, said spacing and retaining means constituting the sole means whereby the band is supported from the tire.

6. In a spare tire cover, a circular band formed to be disposed at the outer periphery of the tire and including an upper portion formed to extend rearwardly across the median plane of the tire, spacing means engageable with the tread to space said upper portion therefrom without interfering with the placing of said portions into proper tire protecting position, a lower portion engageable with the tread and extending rearwardly to a point short of the median plane of the tire, so that the band may be shoved onto the tire without interference from said lower portion, and resilient retaining means associated with said lower portion and arranged to spring into engagement with the tire at the rear of said plane so as to cooperate with said spacing means in holding the band on the tire.

7. In a spare tire cover, a circular tread covering band, flexible spacing means for accommodating said band to treads of different diameters and arranged to space a part of the band from the tread without interfering with the placing of the band into proper tire protecting position, and band retaining means comprising a spring pressed arm arranged to extend transversely across the median plane of the tire and being engageable with the tire to hold the band in said position.

8. In a spare tire cover, a circular tread covering band, flexible spacing means for accommodating said band to treads of different diameters and arranged to space a part of the band from the tread without interfering with the placing of the band into proper tire protecting position, and band retaining means engageable with the tire to hold the band in said position, said retaining means comprising a spring pressed arm arranged to extend transversely across the median plane of the tire and being movable so as not to interfere with the placing of the band as aforesaid.

GEORGE ALBERT LYON.